United States Patent
Siegel et al.

(10) Patent No.: US 7,278,023 B1
(45) Date of Patent: Oct. 2, 2007

(54) SYSTEM AND METHOD FOR DISTRIBUTED NETWORK ACESS AND CONTROL ENABLING HIGH AVAILABILITY, SECURITY AND SURVIVABILITY

(75) Inventors: Neil G. Siegel, Rancho Palos Verdes, CA (US); Ronald J. Kozel, Redondo Beach, CA (US); David C. Bixler, Hermosa Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 686 days.

(21) Appl. No.: 09/589,747

(22) Filed: Jun. 9, 2000

(51) Int. Cl.
*H04K 1/00* (2006.01)
*G06Q 99/00* (2006.01)

(52) U.S. Cl. .................. 713/183; 713/155; 713/181; 380/30; 705/50; 705/56; 705/74

(58) Field of Classification Search ............... 713/103, 713/183, 181
See application file for complete search history.

(56) References Cited

U.S. PATENT DOCUMENTS 5,241,594 A * 8/1993 Kung ..................... 709/227
5,289,540 A * 2/1994 Jones .................... 713/165

(Continued)

FOREIGN PATENT DOCUMENTS

EP 1162531 A2 * 12/2001

(Continued)

OTHER PUBLICATIONS

NN880530, Remote Security Anchoring of Remote User Identification, May 1, 1988, IBM Technical Disclosure Bulletin, IBM, Issue No. 12, vol. 30, p. 30-33.*

(Continued)

*Primary Examiner*—Firmin Backer
(74) *Attorney, Agent, or Firm*—Tarolli, Sundheim, Covell & Tummino LLP

(57) ABSTRACT

A system, method and computer program that administers access and security on a network having more than one computer system connected thereto. This system, method and computer program has a local password file (1500) which is one-way encrypted and contains user identifications, associated one-way encrypted passwords and associated privileges for each authorized user allowed access to the wide area network (10). A user login module (1200) is used to receive a user identification or role and password from a user and login the user when a match is found in the local password file (1500). A channel monitoring and filtering module (1000) is provided to monitor and receive broadcast or multicast messages within the wide area network (10) and display the message to the user when the user's associated privileges permit the viewing of the message. This system, method and computer program also has a password management module (1300) to update and insure that all the computers in the network contain the same local password file (1500). A remote auditing module (1400) is provided to monitor and process anomalous events which may occur on a user's computer. A remote control module is also provided to enable a systems administrator or security officer to take appropriate action when a critical event transpires. An authentication module is also provided to enable a system administrator or security officer an option to check and confirm a password entered by a user for re-authentication.

35 Claims, 8 Drawing Sheets

U.S. PATENT DOCUMENTS

| | | | |
|---|---|---|---|
| 5,596,502 A * | 1/1997 | Koski et al. | 700/95 |
| 5,666,415 A * | 9/1997 | Kaufman | 380/28 |
| 5,673,315 A * | 9/1997 | Wolf | 705/59 |
| 5,721,779 A * | 2/1998 | Funk | 380/30 |
| 5,787,169 A * | 7/1998 | Eldridge et al. | 380/286 |
| 5,889,866 A * | 3/1999 | Cyras et al. | 713/183 |
| 5,953,422 A * | 9/1999 | Angelo et al. | 713/185 |
| 6,148,404 A * | 11/2000 | Yatsukawa | 380/30 |
| 6,178,508 B1 * | 1/2001 | Kaufman | 713/183 |
| 6,185,316 B1 * | 2/2001 | Buffam | 382/100 |
| 6,230,269 B1 * | 5/2001 | Spies et al. | 380/279 |
| 6,285,966 B1 * | 9/2001 | Brown et al. | 702/188 |
| 6,367,017 B1 * | 4/2002 | Gray | 340/5.2 |
| 6,760,843 B1 * | 7/2004 | Carter | 713/200 |
| 2003/0093518 A1 * | 5/2003 | Hiraga | 709/224 |
| 2004/0049294 A1 * | 3/2004 | Keene et al. | 700/5 |
| 2005/0027797 A1 * | 2/2005 | San Andres et al. | 709/203 |

FOREIGN PATENT DOCUMENTS

| | | | |
|---|---|---|---|
| JP | S60-164859 | | 8/1985 |
| JP | H8-221338 | | 8/1996 |
| JP | H8-314805 | | 11/1996 |
| WO | WO 99/21324 | * | 4/1999 |
| WO | WO 99/46691 | | 9/1999 |
| WO | 9957625 | | 11/1999 |

OTHER PUBLICATIONS

Stallings, William, "Network Security Essentials: Applications and Standards On", Prentice-Hall, ISBN 0-13-016093-8, pp. 282-285.

Matt Bishop, *UNIX Security in a Supercomputing Environment*, IEEE, Proceedings of the Supercomputing Conference, Reno, Nov. 13-17, 1989, New York, IEEE, US, vol. Conf. 2, Nov. 13, 1989, pp. 693-698.

* cited by examiner

Module Configrtion Diagram

User Login Module

Password Management Module

Remote Auditing Module

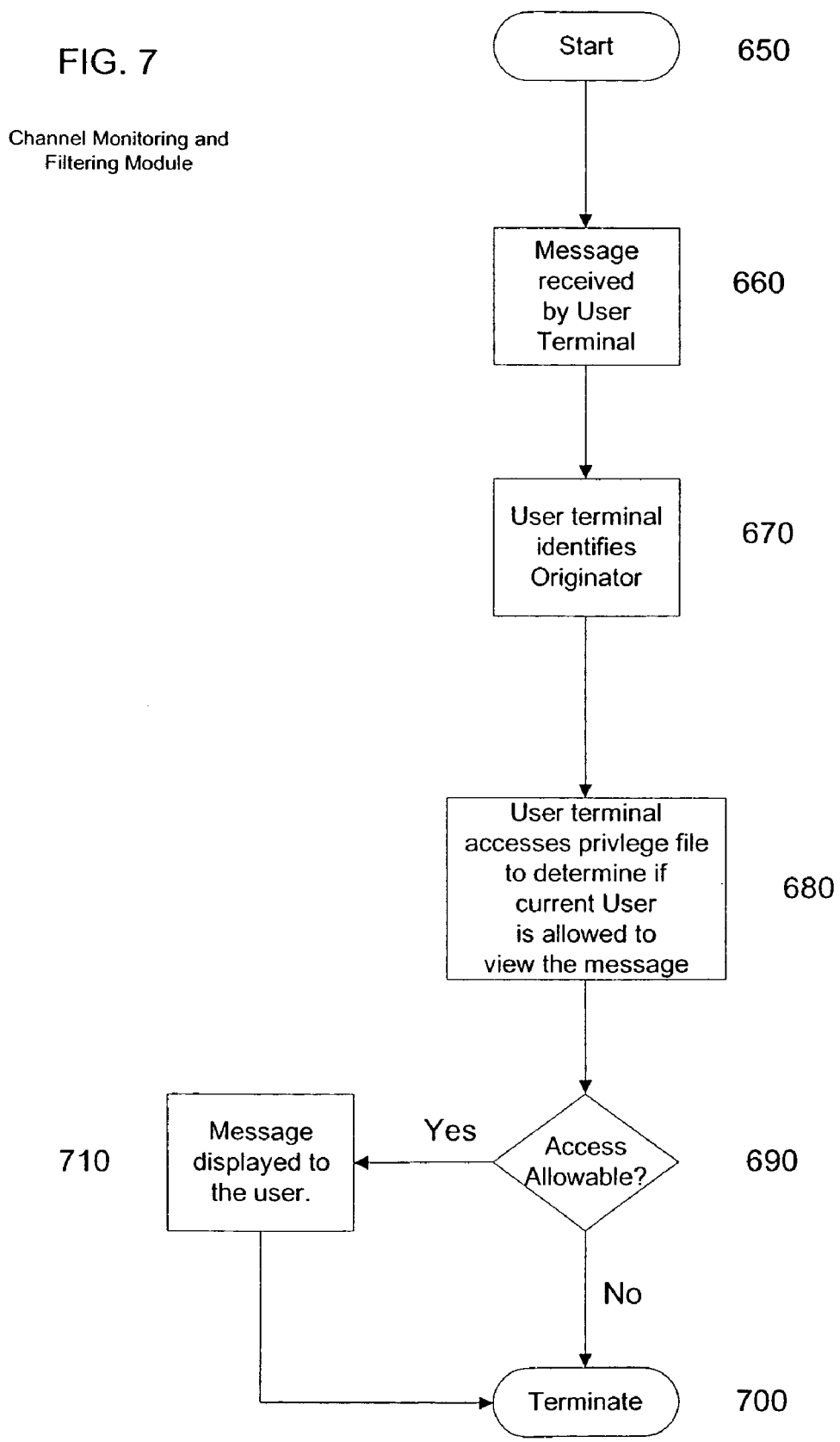

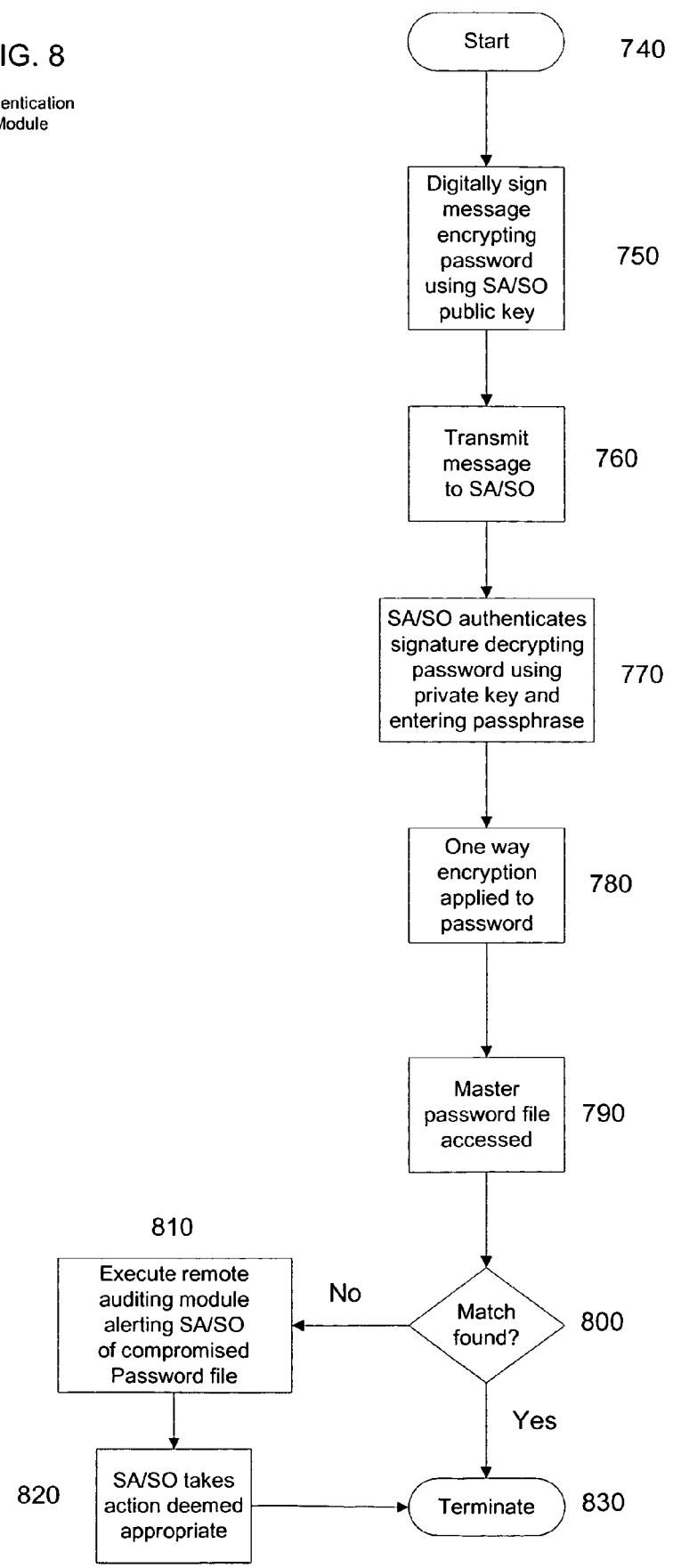

SYSTEM AND METHOD FOR DISTRIBUTED NETWORK ACESS AND CONTROL ENABLING HIGH AVAILABILITY, SECURITY AND SURVIVABILITY

STATEMENT REGARDING FEDERALLY SPONSORED RESEARCH OR DEVELOPMENT

This invention was made with Government support under contract number DAAB07-95-D-E604 awarded by the United State Army. The Government has certain rights in the invention.

FIELD OF THE INVENTION

The invention relates to a system and method for network access and control enabling high availability, security and survivability. More particularly, the invention employs a system, method and computer program to allow access to and control of a distributed network over a low band width communications media while keeping communications traffic over the communications related to access and control to a minimum.

BACKGROUND OF THE INVENTION

Over the relatively short history of the computer industry dramatic changes have occurred. The most significant of these changes has been the incredible drop in hardware prices along with the equally incredible improvement in performance, reliability, size and ruggedness of computer hardware. The reliability and performance of computers have improved to the point where the military is able to place computers in each individual combat vehicle. In this manner a wide area network of computers is formed which may be used to receive orders and other mission critical data, such as the position of enemy and friendly troops, as well as their movements. However, implementing security on such a wide area network is a difficult undertaking. One of the many challenges is the sheer size such a network may take. Thousands of nodes of various types of computers may have access to the network. Further, most users may be authorized to receive only a portion of the data being transmitted over such a network. Still further, since the network operates over a battlefield, the use of cable to enable high-speed communications is out the question. Only radio or microwave communications methods could be utilized either directly, or via a satellite system. However, the use of radio or microwave communications limits the speed at which data may be transmitted over the network. Even when a high-speed cable-based network is utilized, due to the large number of nodes on a network, it is still imperative to keep administrative data traffic to an absolute minimum.

In addition to the communications issues, a significant security issue exists. Most soldiers in the field that would have access to the system would not be authorized ("cleared") to receive most of the information traveling across the network. Of those individuals on the network that are cleared to receive classified information, not all would be at the same level of security clearance. Therefore, mechanisms have been attempted that partition the network into a multilevel security system. However, these multilevel systems are often complex, expensive, require large amounts of the available bandwidth in to order function properly, and are very man-power-intensive to administer. Therefore, implementing such a multilevel security system on a battlefield over a relatively low bandwidth communications system is not possible. This is further compounded by the fact that in a battle, vehicles may be captured. If the enemy could tap into the battle plans and troop movements of our forces, it would provide the enemy with a tremendous advantage in a battle.

It should be noted that many of the same problems encountered by the military in implementing a large wide area network are also experienced by major corporations having tens of thousands of employees all with their own personal computers connected worldwide over a wide area network. Most employees in a corporation fall into the same category as most soldiers in the field. Namely, most employees have no need or requirement to access all of the information on a wide area network. Further, most corporations have competitors which are both domestic and foreign and who could benefit from inside information relating to new products in development and bids being issued by the corporation. Therefore, in both military and commercial applications it is vital to enable authorized personnel access to required information quickly and easily, while blocking access to unauthorized individuals. These unauthorized individuals may include enemy troops, competitors, or the ubiquitous hacker. As noted by recent denial-of-service attempts and the email virus/worm infiltration of corporate computers, a hacker may cost businesses billions of dollars in wasted effort and loss of valuable information. Further, a business can be ruined by a hacker or disgruntled employee accessing customer credit card (or similar) information and publishing it on the worldwide web.

Beyond the use of multilevel security systems, the primary method of providing security has been through the use of a password access method. In such a password-based system, a user would be denied access to a computer system or a network in the event that the proper password associated with the user was not entered. Typically, a single password file would be stored on a server in a local area network, and upon start-up of a particular computer system on that local area network, the user ID and password would be checked against those in the server. This works well when the number of potential users is relatively small and substantial band width is available for users to simultaneously logon. However, where a large number of users attempt to logon to the system simultaneously, access to the single password file would form a bottleneck in the system. Further, the necessity that users must always log into a single server on the network, in order to gain access, makes the server a single point of failure. Failure could lock out users throughout the network. User's passwords are conventionally either transferred to the server over the network in clear text (unencrypted), where they are vulnerable to be discovered by an adversary, or they are encrypted in transit but saved in clear text on the server. Thus, the server becomes a target in the battlefield for conventional warfare, as well as cyber warfare applicable to both the military and commercial enterprises.

In an attempt to alleviate the formation of a bottleneck in a large network, passwords for individual users have been stored on their local machines. Upon start-up of the local computer, the user would log onto his assigned computer system and enter his password. Failure to provide such a password would prevent access to that individual computer. This eliminates the overhead associated with a central password file, but it restricts each user to using only the particular computers on the network assigned to them. If a computer fails, the employee may not use another employee's computer in order to complete his assigned tasks. Thus, resources are wasted.

Therefore, what is needed is a system, method, and computer program that will provide a high degree of security for a local and wide area network, while keeping administrative communications traffic required to implement security to an absolute minimum. Further, this system, method, and computer program must block access to unauthorized users and users without the proper security clearance. In addition, a user must be able to logon to any computer system in the network and be able to of receive messages and access information for the particular user or his role in the organization. The security system must also prevent an unauthorized user from accessing passwords for other users on the system even when the unauthorized user has complete access to a particular computer on the network. Also, this security system must enable a security officer or systems administrator to remotely disable a computer which has fallen (or is suspected of having fallen) into an unauthorized user's hands.

SUMMARY OF THE INVENTION

An embodiment of the present invention provides for a method of administering access and security on a network having a number of computers. This method begins by installing a local password file containing one-way encrypted passwords on each computer in the network. This local password file includes several user identifications, associated one-way encrypted passwords and associated privileges for each authorized user allowed access to the computers on the network. The one-way encryption occurs on a password entered by a user when the user logs into a computer on the network. The one-way encrypted password entered by the user is checked against the one-way encrypted passwords stored in the password file. Access is enabled to data and software contained on the computer and the network, permitted by the associated privileges for the user, when a match is found on the password file containing one-way encrypted passwords. Filtering occurs and displaying messages to the user, permitted by the associated privileges, when a match is found on the password file containing one-way encrypted passwords.

Further, an embodiment of the present invention creates a system to administer access and security on a network having several computers. This system has a password file containing one-way encrypted passwords, on each computer in the network. The password file includes several user identifications, associated (one-way encrypted) passwords and associated privileges for each authorized user allowed access to the computer and the network. This system also has a user login module to receive a user identification, or role, and password from a user and login the user when a match is found in the password file containing one-way encrypted passwords. Still further, the system also has a channel monitoring and filtering module to monitor and receive broadcast or multicast messages within the network and display a message to the user when the user's associated privileges permit the viewing of the message.

Still further, an embodiment of the present invention is a computer program executable by a computer and embodied on a computer readable medium to administer access and security on a network having several computers. This computer program has a password file containing one-way encrypted passwords on each computer in the network. The one-way encrypted password file includes several user identifications, associated (one-way encrypted) passwords and associated privileges for each authorized user allowed access to the computer and the network. This computer program also has a user login code segment to receive a user identification, or role, and password from a user and login the user when a match is found in the password file containing one-way encrypted passwords. Still further, the computer program also has a channel monitoring and filtering code segment to monitor and receive broadcast or multicast messages within the network and display the message to the user when the user's associated privileges permit the viewing of the message.

These and other features of this system, method and computer program will become more apparent from the following description when taken in connection with the accompanying drawings which show, for purposes of illustration only, examples in accordance with the present invention.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein:

FIG. 7 is a flowchart of a channel monitoring and filtering module used in an example embodiment of the present invention; and FIG. 8 is a flowchart of an authentication module used in an example embodiment of the present invention.

DETAILED DESCRIPTION

Figure 1:
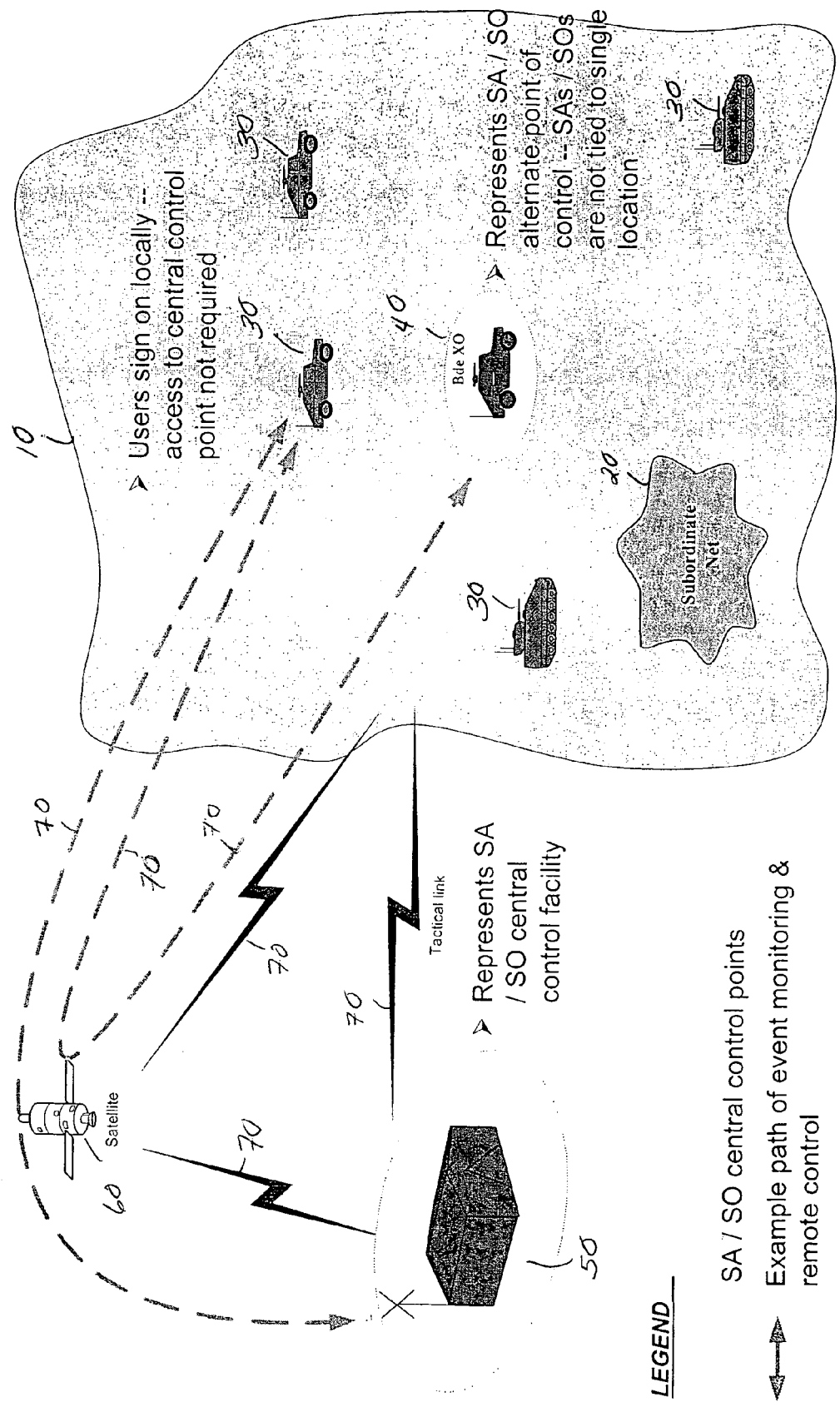
FIG. 1 is an example of a wide area network implemented in a military environment.

Before beginning a detailed description of the subject invention, mention of the following is in order. When appropriate, like reference numerals and characters may be used to designate identical, corresponding or similar components in differing figure drawings. Further, in the detailed description to follow, exemplary sizes/models/values/ranges may be given, although the present invention is not limited to the same.

FIG. 1 is an example of a wide area network 10 implemented in a military environment. However, it should be noted that the embodiments of the present invention may be implemented and utilized on any commercial local area network and wide area network. In FIG. 1, a wide area network 10 is shown having various military vehicles 30, each of which may contain at least one processor-based system used to access the wide area network 10. This processor-based system may be, but not limited to, a palm computer, personal digital assistant (PDA), lap-top computer or personal computer. In addition to the military vehicles 30, one of these military vehicles 30 has been designated as brigade executive officer (Bde XO) vehicle or systems administrator's or security officer's (SA/SO) 40 vehicle. This is done to indicate that the systems administrator's or security officer's computer system may be located on any user terminal located within a military vehicle 30. Normally, however, the SA/SO computer system would be located in a structure 50 away from the area of battle. Communications between structure 50 and the wide area network 10 would be through radio frequencies 70 either directly or through a satellite 60. Further, any number of subordinate networks 20 may be contained within wide area network 10.

As discussed above, the wide area network 10, shown in FIG. 1, need not be restricted to usage in a battlefield environment or to radio communications. The wide area network 10 may be a local area network or a wide area network used commercially by a corporation in which communications between nodes is established by coaxial cable, fiber optic cable, twisted pair, or any other suitable communications method available. Further, any type of packet switching network software commercially available may be utilized to establish communications between nodes in the wide area network 10. Therefore, the present invention is not restricted to a military environment and is only restricted by the language of the claims.

Figure 2:
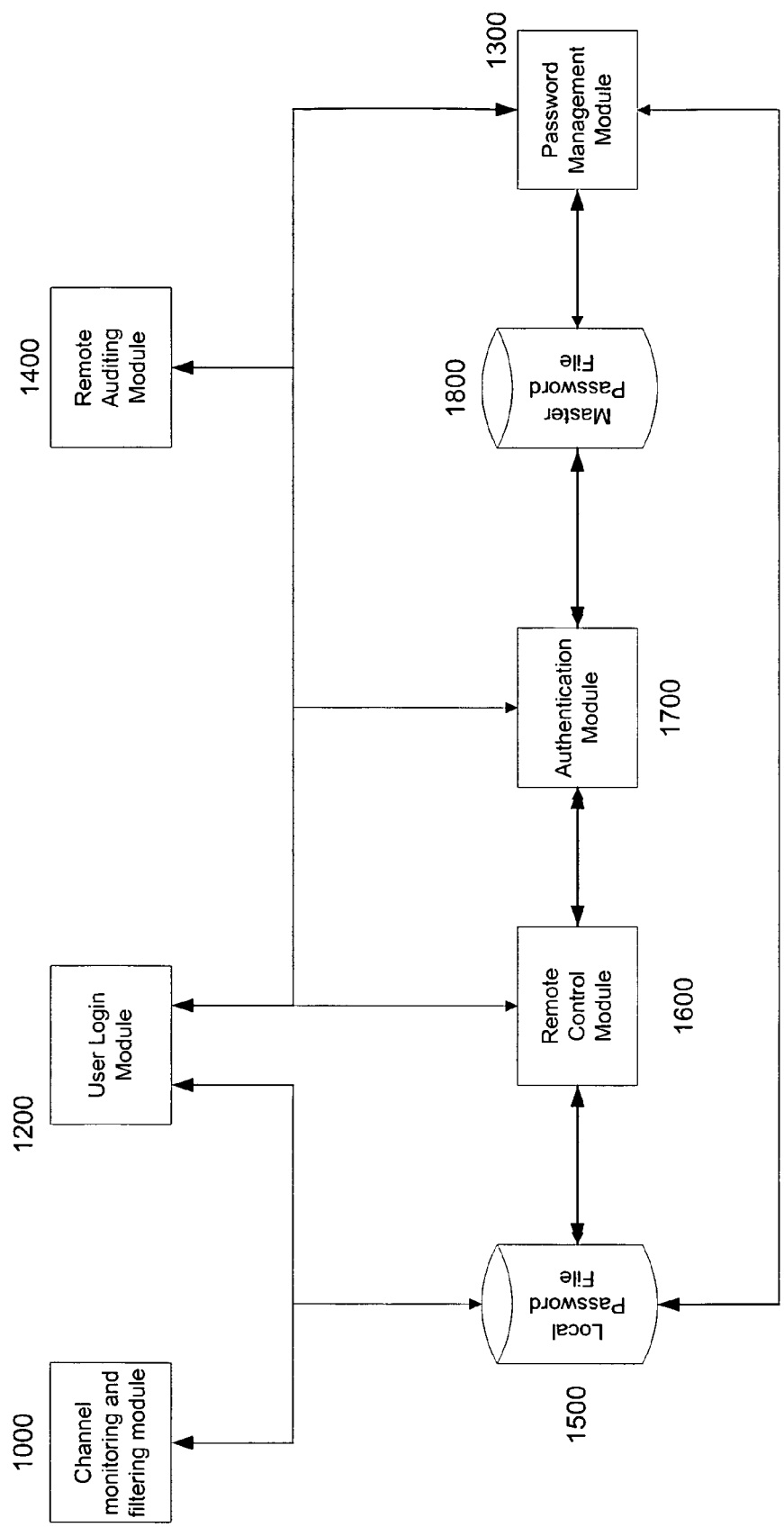
FIG. 2 is a module configuration diagram of the software, firmware, and hardware used in the embodiments of the present invention.

FIG. 2 illustrates an example of an embodiment of the present invention in which a portion of the software, firmware and hardware required to perform the specific tasks is illustrated. The blocks illustrated in FIG. 2 represent modules, code, code segments, commands, firmware, hardware, instructions and data that are executable by a processor-based system(s) and may be written in a programming language, such as, but not limited to, C++. The discussion provided below is directed to a security system used in a local or wide area network of computers. However, as would be appreciated by one of ordinary skill in the art, the embodiments of the present invention may be used in numerous software applications.

Still referring to FIG. 2, a channel monitoring and filtering module 1000 is illustrated communicating to a local password file 1500. The channel monitoring and filtering module 1000 includes, but is not limited to, operation 650 through operation 710 shown in FIG. 7. The channel monitoring and filtering module 1000 is installed on each and every user node, computer system, and military vehicle 30 shown in FIG. 1. The function of the channel monitoring and filtering module 1000 is to monitor for and receive broadcast and multicast messages within the wide area network 10 and determine the privileges or security clearance required by the current user of the computer system in order for that user to view that particular message. The channel monitoring and filtering module 1000 is discussed in further detail in reference to the discussion of FIG. 7.

Still referring to FIG. 2, a user login module 1200 is provided in order to permit login of users and determine the user's privileges and security clearance. The user login module displays a login screen to the user, one-way encrypts the password and determines if the local password file 1500 contains a match. The user login module 1200 includes, but is not limited to, operation 100 through operation 200 shown and discussed in reference to FIG. 3.

Still referring to FIG. 2, a password management module 1300 is provided to enable updating of all local password files 1500 located within the wide area network 10. Each and every computer system in the wide area network 10 including the systems administrator's or security officer's computer system contain an identical password file. In the case of the systems administrator or security officer the password file is referred to as the master password file 1800. The password management module 1300 insures that all computer systems in wide area network 10 contain the same password file. The password management module 1300 may also optionally maintain a log of all computer systems that have been updated with the latest version of the password file. This password file contains all user identifications (Ids) and passwords for all authorized users of the wide area network 10. It also includes the privileges associated with each user and serves to prevent non-authorized individuals from accessing privileged data. Further, the password file need not be structured exclusively by user ID, but may be based on roles or titles of authorized users to the wide area network 10. Also, the password file, which is both the master password file 1800 and the local password file 1500, need not necessarily contain the user's privileges since these privileges may be contained in a separate file with pointers thereto from the password file.

Still referring to FIG. 2, a remote auditing module 1400 is provided in order to monitor and process anomalous or other security critical events which may occur on a user terminal or military vehicle 30. These critical events include, but are not limited to:

1. A user has exceeded the number of allowable unsuccessful login attempts;
2. Changes that have occurred in the users need to know security clearance or role;
3. A system disable operation was initiated by the user;
4. A user's password has expired;
5. A message was rejected due to an invalid digital signature;
6. A request for a remote user re-authorization, initiated by the Security Officer (SO), has been implemented on the remote user terminal;
7. A request for a remote user lockout, initiated by the SO, has been implemented on the remote user terminal;
8. A request for a remote terminal disable, initiated by the SO, has been initiated at the remote user terminal; and
9. A request for remotely loading passwords, initiated by the SO, has completed successfully on the remote user terminal.

When the foregoing and other anomalous events occur, the user's computer system may be immediately shut down and vital files, such as the password file, may be erased. Otherwise, the remote control module 1600 may be executed so that the systems administrator or security officer may take the appropriate action.

Still referring to FIG. 2, a remote control module 1600 is provided so that the systems administrator or security officer may take the appropriate action when certain events transpire. Such events may include the anomalous events discussed above. In addition to taking action in response to the foregoing events, the system administrator or security officer may simply periodically or randomly request re-authentication of users on user terminals in military vehicles 30.

Still referring to FIG. 2, an authentication module 1700 is provided so that upon successful local re-authentication by a user, (as an option to the system administrator or security officer) the re-authentication is checked and confirmed against the master password file 1800 stored at the systems administrator's or security officer's computer system. Since the local password file 1500 stored in the user's computer system or in a military vehicle 30 should be identical to the master password file 1800 stored in the systems administrator's or security officer's computer system then the authentication module 1700 should return a confirmation of the user's identity. This is provided so that in the event that the local password file 1500 has been bypassed, this may be detected and further appropriate remote control actions taken by the system administrator or security officer immediately.

Figure 3:
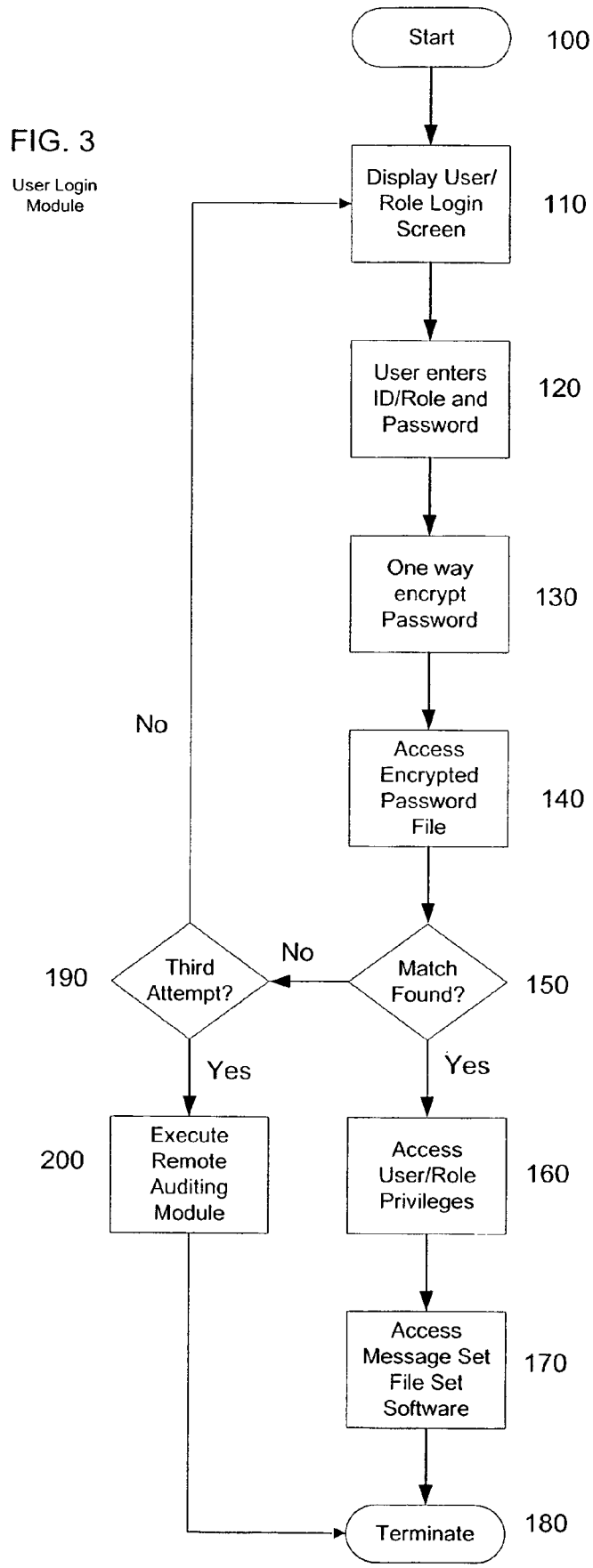
FIG. 3 is a flowchart of a user login module used in an example embodiment of the present invention.

FIG. 3 is a flowchart of a user login module 1200 used in an example embodiment of the present invention. The user login module 1200 begins execution in operation 100 and thereafter immediately proceeds to operation 110. In operation 110, a user/role login screen is the displayed on the user terminal, computer system or military vehicle 30. In operation 120, the user enters his user ID/role and password. Thereafter in operation 130, the user password is one-way encrypted. One-way encryption is discussed in Stallings, William, "Network security essentials: applications and standards on", Prentice-Hall, ISBN 0-13-016093-8, pages 282 through 285, herein incorporated by reference. In operation 140, using the user ID/role and encrypted password received in operation 130, the local password file 1500 is accessed. The passwords in the local password file 1500 are also one-way encrypted. Therefore, if a match is found, it is based on the comparison of a one-way encrypted password with a stored one-way encrypted password. In this way even if the local password file 1500 were to fall into to unauthorized hands, the original passwords could not be deciphered. If a match is found in operation 150, processing proceeds to operation 160. In operation 160, the user's/role privileges are accessed. These privileges or security clearance may be stored as a bit pattern associated with the user ID and password in the local password file 1500 or separately in another file. In either case, processing proceeds to operation 170 where, based on the privileges retrieved, the message set, file set and software associated with this security clearance or privilege are accessed. Thereafter, processing terminates for the user login module 1200 in operation 180.

However, if a match is not found in operation 150, then processing proceeds to operation 190 in which it is determined if this is the third failed attempt at logon. If this is not the third failed attempt, then processing proceeds back to operation 110 where the individual is requested to login again. However, if this is the third failed attempt at logon, then processing proceeds to operation 200 where the remote auditing module 1400 is executed.

Figure 4:
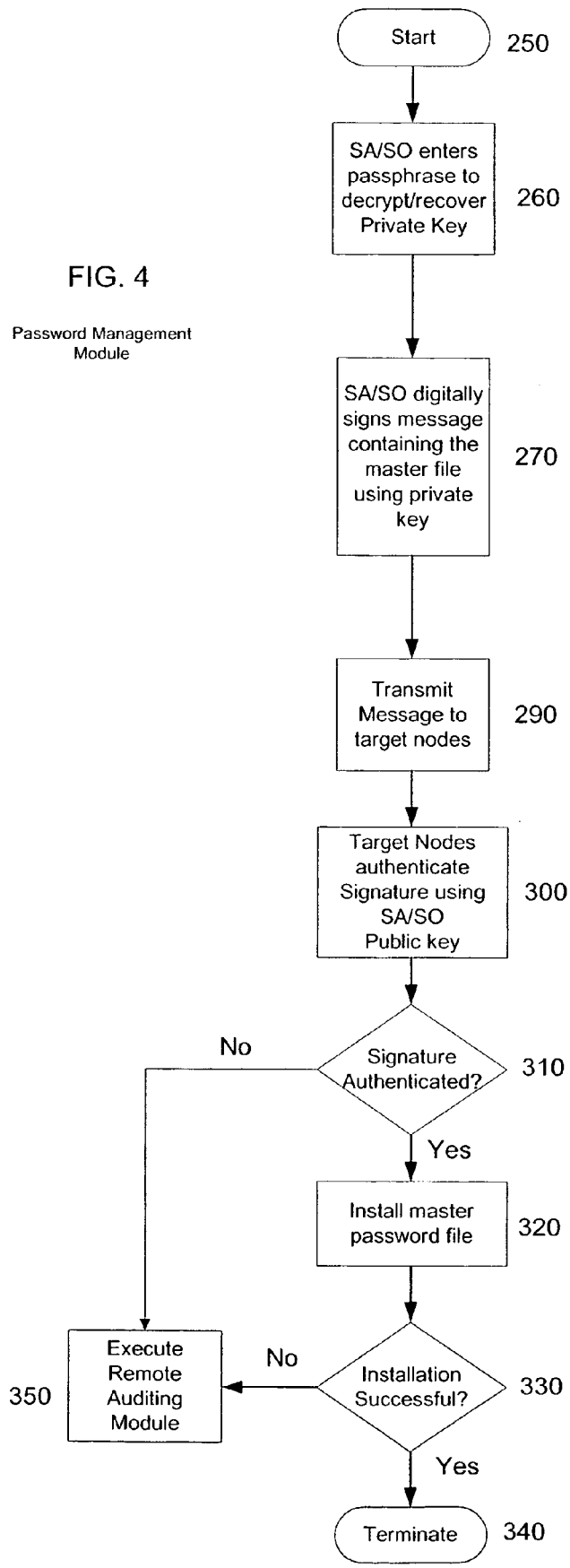
FIG. 4 is a flowchart of a password management module used in an example embodiment of the present invention.

FIG. 4 is a flowchart of a password management module 1300 used in an example embodiment of the present invention. The password management module 1300 begins execution in operation 250 and immediately proceeds to operation 260. In operation 260, the SA/SO (system administrator/security officer) enters his passphrase to decrypt/recover his private key. In operation 270, the SA/SO using the decrypted private key, digitally signs a message containing the master password file, to be broadcast to all users of the wide area network 10. The message is broadcast or multicast to the entire wide area network 10 or targeted users or military vehicles 30 on the wide area network 10 in operation 290. In operation 300, the targeted nodes, users, computer systems, or military vehicles 30 authenticate the digital signature using the SA/SO public key which is stored locally on their systems. In operation 310, it is determined if the digital signature has been authenticated. If the digital signature has been authenticated in operation 310 then processing proceeds to operation 320. In operation 320, the master password file 1800 is installed in the local system as the local password file 1500. Thereafter, in operation 330, a determination is made whether the installation was successful. If the installation was successful, then processing proceeds to operation 340 where the password management module 1000 terminates execution.

However, if either the digital signature is not authenticated in operation 310 which would indicate that the local user terminal does not have the proper public key for the SA/SO or the installation is determined to be unsuccessful in operation 330, then processing proceeds to operation 350 where the remote auditing module 1400 is executed.

Figure 5:
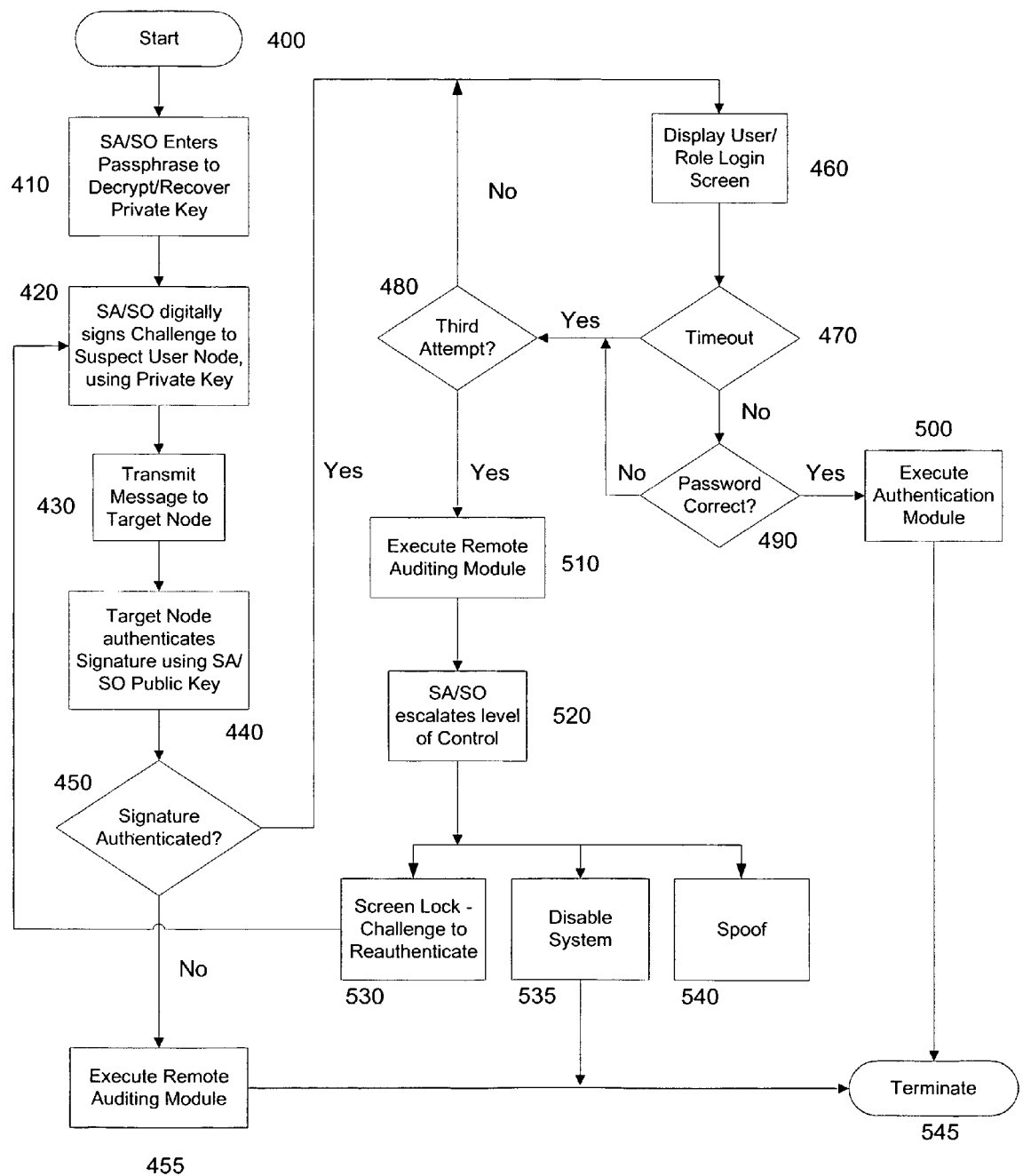
FIG. 5 is a flowchart of a remote control module used in an example embodiment of the present invention.

FIG. 5 is a flowchart of a remote control module 1600 used in an example embodiment of the present invention. The remote control module 1600 begins execution in operation 400 and immediately proceeds to operation 410. In operation 410, the SA/SO enters his passphrase in order to decrypt his associated private key. Thereafter, in operation 420, the SA/SO digitally signs a challenge message to be delivered to a suspect user node using the SA/SO private key. This challenge may be caused by any number of events. These events may include anything from a random request to re-authentication to a suspected capture of a military vehicle 30 by enemy troops. Then in operation 430, the message containing the challenge is transmitted to the targeted user node, such as a military vehicle 30. Upon receipt, in operation 440, of the message, the target node authenticates the signature using the SA/SO public key. In operation 450, it is determined whether the message was authenticated using the SA/SO public key. If the signature cannot be authenticated, processing proceeds to operation 455 where the remote auditing module 1400 is executed. This failure to authenticate the digital signature in operation 450 may be indicative of an unauthorized user masquerading as the SA/SO. Thereafter, processing proceeds to operation 545 where the remote control module 1600 terminates execution.

However, if the digital signature of the SA/SO is authenticated in operation 450, processing then proceeds to operation 460. In operation 460, the user/role login screen is displayed on the user terminal which may be located in military vehicle 30. Thereafter, processing proceeds to operation 470 where it is determined if a timeout has occurred to the user's failure to enter a password. If a timeout has not occurred then processing proceeds to operation 490. In operation 490, it is determined whether the password entered by the user is correct. If either in operation 470, a timeout condition exists, or in operation 490, password is incorrect, then processing proceeds to operation 480. In operation 480, it is determined whether this is the third failed attempt by the user to enter the correct password. If in operation 480 is determined that this is not the third failed attempt, then processing loops back to operation 460 where the user is once again requested to enter the correct password. The selection of three failed attempts to login is strictly arbitrary and completely up to the discretion of the SA/SO.

However, if in operation 480 it is determined that this is the third failed attempt at login by the user, processing proceeds to operation 510. In operation 510, the remote auditing module 1400 is executed. Thereafter, processing proceeds to operation 520 where the SA/SO may escalate the level of control over the user terminal which may be located in military vehicle 30. The SA/SO has at least three options available to him as indicated in operations 530, 535, and 540. However, these are a limited number of options illustrated and are not exhaustive of all possibilities. In operation 530, the SA/SO may lock the terminal screen, which may be located in military vehicle 30, so that the user may only respond to the login screen in order to re-authenticate his user ID and password. Thereafter, processing proceeds to operation 420 from operation 530 so that the user may receive a challenge message and again attempt to enter the correct password in operation 460. However, in operation 460 an indication is supplied that a screen lock condition exists and no other functions are permitted. Further, the SA/SO, in operation 535, may totally disable the user terminal, which may be located in the military vehicle 30. Totally disabling the user terminal would entail deleting certain files on the users disk drive or memory and shutting down the system. In operation 540, the SA/SO may decide to spoof the user into believing he has successfully logged into the system and wide area network 10. Thereafter, in operation 540, the SA/SO may provide the user with false information intended to mislead the user and this may continue indefinitely. When 535 is selected, processing proceeds to operation 545 where processing terminates for the remote control module 1600.

Figure 6:
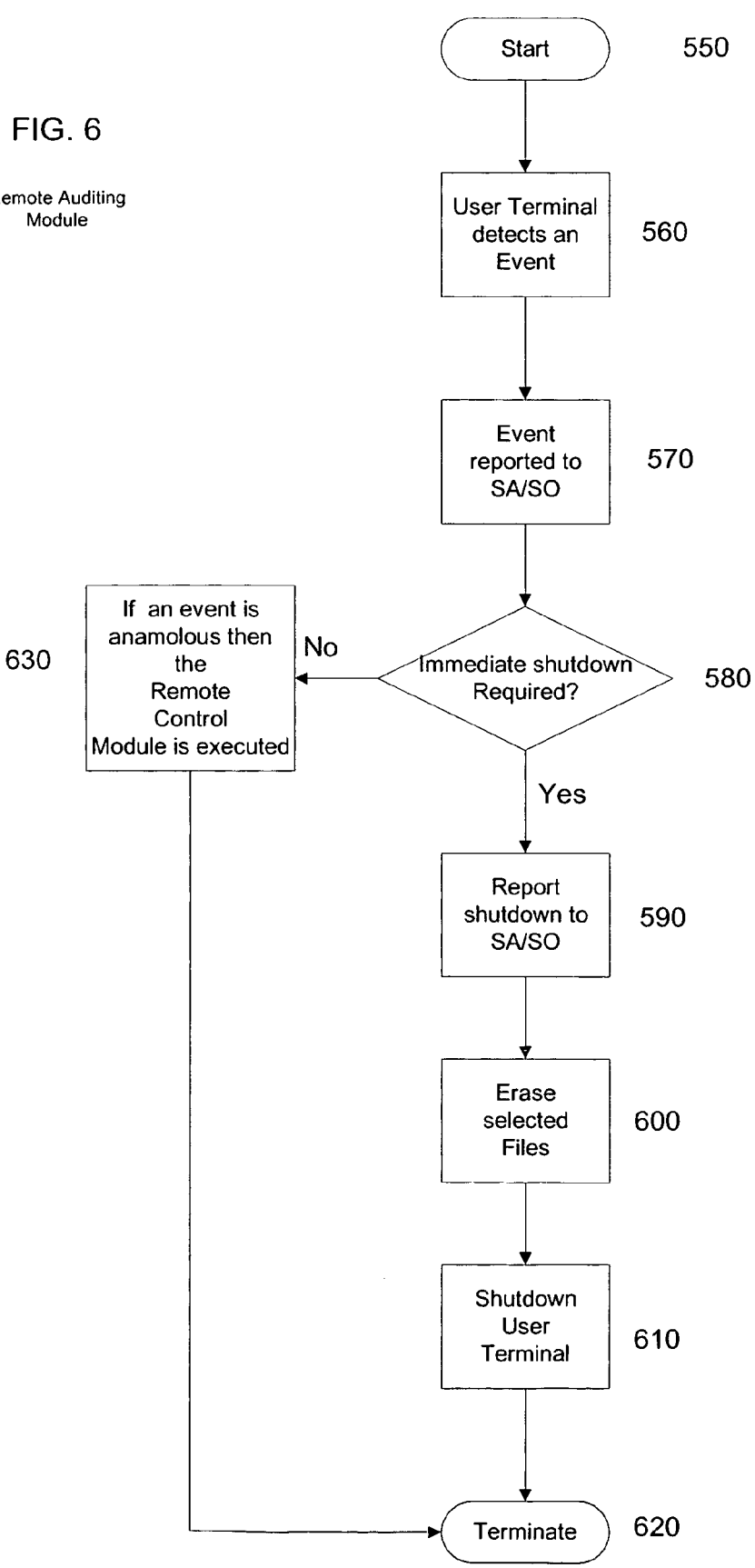
FIG. 6 is a flowchart of a remote auditing module used in an example embodiment of the present invention.

FIG. 6 is a flowchart of a remote auditing module 1400 used in an example embodiment of the present invention. The remote auditing module 1400 begins execution in operation 550 and immediately proceeds to operation 560. In operation 560, an anomalous event is detected by the local user terminal which may be in a military vehicle 30. The types of anomalous events which may occur have been previously discussed and will not be repeated here. Thereafter, in operation 570 this anomalous event is reported to the SA/SO. Then in operation 580 the determination is made whether to immediately shut down the user terminal. This immediate shut down would occur when a soldier determines that the vehicle is about to be captured and indicates so on the terminal. Thereafter in operation 590, the report of imminent shut down is reported to the SA/SO. In operation 600, selected critical files are erased. Finally in operation 610, the terminal is shut down. Thereafter processing proceeds to operation 620 where the remote auditing module 1400 terminates execution.

However, if in operation 580 it is determined that an immediate shut down is not required then processing proceeds to operation 630 where the remote control module 1600 is executed.

FIG. 7 is a flowchart of a channel monitoring and filtering module 1000 used in an example embodiment of the present invention. The channel monitoring and filtering module 1000 begins execution in operation 650 and immediately proceeds to operation 660. In operation 660, a message is received by the user terminal in military vehicle 30. In operation 670, the user terminal identifies the originator of the message.

Thereafter, in operation 680 the user terminal accesses the local password file 1500 in order to retrieve the privileges of the user currently logged into the user terminal. Thereafter, in operation 690, it is determined whether the current user may access and view the message received in operation 660. If in operation 690 it is determined that the current user may view the message received in operation 660, then processing proceeds to operation 710 where the message is displayed to the user. Thereafter, whether the user has seen the message or not, processing proceeds to operation 700 where execution of the channel monitoring and filtering module 1000 is terminated.

FIG. 8 is a flowchart of an authentication module 1700 used in an example embodiment of the present invention. The authentication module 1700 begins execution in operation 740 and immediately proceeds to operation 750. In operation 750, the user terminal, perhaps the military vehicle 30, digitally signs a message, encrypting the user password that the user has entered, along with the signature authentication data, using the SA/SO public key. This SA/SO public key was originally installed with the user terminal or downloaded at some later date by the SA/SO. The user terminal then transmits the message to the SA/SO. Then in operation 770, the SA/SO upon receipt of the message immediately authenticates the signature, decrypting the user password along with the signature authentication data, using his private key after entering his passphrase. The ability to decrypt the encrypted key received is evidence that the user has possession of the appropriate public key. Thereafter, the password is one-way encrypted in operation 780, and in operation 790, the master password file 1800 is accessed. In operation 800, if a match is found in the master password file 1800 then it is determined that the user is most likely the authorized user and processing proceeds to operation 830 where the authentication module 1700 terminates execution.

However, if in operation 800 it is determined that a match does not exist then it may be assumed that the local password file 1500 in the user terminal, perhaps in the military vehicle 30, has been compromised. This assumption may be reached since in order to reach this point in processing it would have been necessary for the user to enter a password contained in the local password file 1500 on his terminal perhaps within a military vehicle 30. In operation 810, the SA/SO is alerted to this possible compromised password file by the execution of the remote auditing module 1400. Thereafter, in operation 820 the SA/SO may take any action he determines appropriate. This may include disabling the user's computer system or engaging in a spoofing operation as previously discussed.

Using the embodiments of the present invention, a systems administrator or security officer may manage security on a local or wide area network with minimal overhead or interference in communications on the network. This is accomplished through the use of a password file containing one-way encrypted passwords that reside on each user computer and is difficult if not impossible for someone to decipher. This file containing one-way encrypted passwords enables users to log onto any system in the network and have access to software and information that is permitted for their security level and privileges. However, even if the local password file is bypassed, the embodiments of the present invention can detect this and enable the systems administrator or security officer to take the appropriate action. Further, the bulk of the processing necessary to effectuate the embodiments of the present invention takes place on the user computer system and has minimal impact to the operation of the network. It should be noted that all passwords are one-way encrypted and all private keys are encrypted using a passphrase, thereby making it difficult to an unauthorized user to access them. Thus, no password or private key is stored in the clear so that an unauthorized user can access them.

While we have shown and described only a few examples herein, it is understood that numerous changes and modifications as known to those skilled in the art could be made to the present invention. For example, reference has been made to the use radio and microwave communications, but the embodiments of the present invention are not limited to these form of communications. The embodiments of the present invention will operate in any type of local or wide area network using anything from twisted pair over the public switched telephone network to leased lines as well as coax and fiber optic cable. Further, any sort of communications software may be used for communications in the network. Therefore, we do not wish to be limited to the details shown and described herein, but intend to cover all such changes and modifications as are encompassed by the scope of the appended claims.

We claim:

1. A method of administering access and security on a network having a plurality of computers, comprising:
   installing a one-way encrypted password file on each computer of the plurality of computers in the network, wherein the one-way encrypted password file includes a plurality of user identifications associated one-way encrypted passwords and associated privileges for each authorized user allowed access to the plurality of computers and the network;
   one-way encrypting a password entered by a user when the user logs into a computer of the plurality of computers on the network;
   checking for a match between the user identification and one-way encrypted password entered by the user and the plurality of user identifications and one-way encrypted passwords stored in the one-way encrypted password file;
   enabling access to data and software contained on the computer and the network permitted by the associated privileges for the user when a match is found on the one-way encrypted password file;
   broadcasting messages to the plurality of computers, such that each message is received at each computer;
   filtering the broadcast messages at each computer according to the associated privileges of the user associated with each computer, such that a given message will be displayed only where the associated privileges of the user allow the message to be displayed; and
   updating the one way encrypted password file at each of the plurality of computers, wherein updating the one way encrypted password file includes attaching a new master password file to a message at a computer accessible by a systems administrator or security officer, encrypting the message containing the new master password file using a private key and pass phrase available only to the systems administrator or security officer, transmitting the message to the plurality of computers, and decrypting the message at each computer using a public key corresponding to the private key.

2. The method recited in claim 1, wherein the associated privileges contained in the one-way encrypted password file indicate the security level and access privileges of the user identification for access to software, data and messages contained in the computer, the network, and transmitted over the network.

3. The method recited in claim 1, wherein when one or more attempts of the user entering a user identification and one-way encrypted password have failed to match the plurality of user identifications and one-way encrypted passwords contained in the one-way encrypted password file, the method further comprising:
   transmitting to a systems administrator or security officer by the computer a notification of the failure to provide a one way encrypted user identification and password that matches a user identification and one-way encrypted password stored on the one-way encrypted password file.

4. The method recited in claim 3, further comprising:
   locking, upon request by the systems administrator or security officer, the computer being accessed by the user having at least one failed attempt at entering a user identification and one-way encrypted password so as to permit only access to a login screen by the user.

5. The method recited in claim 3, further comprising:
   spoofing, upon request by the systems administrator or security officer, the user into believing that the access has been gained to the computer, wherein spoofing includes the presentation of false messages and information to the user.

6. The method recited in claim 3, further comprising:
   disabling, upon request by the systems administrator or security officer, the computer system so that the user cannot access the computer system.

7. The method recited in claim 6, further comprising:
   deleting, upon request by the systems administrator or security officer, a plurality of files stored in the computer system.

8. The method recited in claim 1, further comprising:
   displaying to a screen on the computer system a request for re-authentication at the direction of a system administrator or security officer.

9. The method recited in claim 8, wherein the request for re-authentication comprises:
   displaying a login screen having a position for entry of the user identification and password.

10. The method recited in claim 9, wherein the user identification is a role or title indicative of a level of authority of the user.

11. The method recited in claim 9, further comprising:
    accessing a master password file on a computer system accessible by the systems administrator or security officer;
    one-way encrypting the password; and
    searching the master password file for a match of the user identification and one-way encrypted password.

12. The method recited in claim 11, further comprising:
    disabling the computer system, or spoofing the user, or locking the computer system when a match is not found for the user identification and one-way encrypted password in the master password file.

13. The method recited in claim 11, wherein after the user has entered the user identification and one-way encrypted password and the user identification and one-way password has matched that found in the one-way encrypted password file, further comprising:
    entering a new password by the user;
    re-authenticating the user identification and one-way password stored on the master password file;
    one-way encrypting the new password; and
    replacing the user identification and password with the one-way encrypted user identification and the new one-way encrypted password in the master password file.

14. The method recited in claim 1, further comprising:
    detecting an anomalous event in a computer of the plurality of computers; and
    reporting the anomalous event to a system administrator or security officer.

15. The method recited in claim 14, wherein the anomalous event comprises:

the user has exceeded the number of allowable unsuccessful login attempts;
a change in the users associated privileges has occurred;
a system disable operation was initiated by the user;
a user's password has expired;
a message was rejected due to an invalid digital signature;
a request for remote user re-authentication has been received by the systems administrator or security officer;
a request for a remote user lockout has been received by the system administrator or security officer; and
a request for remote loading passwords has completed successfully on the system administrator or security officer.

16. The method recited in claim 14, further comprising:
deleting a plurality of files on the computer and disabling the computer in response to an anomalous event when requested by the system administrator or security officer or when an immediate shutdown in requested by the user.

17. The method recited in claim 15, further comprising:
disabling the computer system, or spoofing the user, or locking the computer system when an anomalous event occurs.

18. A system to administer access and security on a network having a plurality of computers, comprising:
a one-way encrypted password file on each computer of the plurality of computers in the network, wherein the one-way encrypted password file includes a plurality of user identifications, associated one-way encrypted passwords and associated privileges for each authorized user allowed access to the plurality of computers and the network;
a user login module to receive a user identification or role and password from a user and login the user when a match is found in the one-way encrypted password file;
a channel monitoring and filtering module to monitor and receive broadcast or multicast messages within the network and display the message to the user when the user's associated privileges permit the viewing of the message; and
a remote auditing module operative to monitor and process anomalous events which may occur on the computer, the anomalous events comprising:
a change in the users' associated privileges;
a system disable operation initiated by the user;
the expiration of a user's password;
the rejection of a message due to an invalid digital signature;
a request for remote user re-authentication received from the systems administrator or security officer;
a request for a remote user lockout received from the system administrator or security officer; and
successful completion of a request for remote loading passwords to a system administrator or security officer.

19. The system recited in claim 18, further comprising:
a password management module to update and insure that all the computers in the network contain the same one-way encrypted password file.

20. The system recited in claim 18, further comprises:
a remote control module to enable a systems administrator or security officer to take appropriate action when an event transpires, wherein the event is an anomalous event.

21. The system recited in claim 20, wherein the appropriate action comprises:

disabling, upon request by the systems administrator or security officer, the computer system so that the user cannot access the computer system; and
deleting, upon request by a systems administrator or security officer, a plurality of files stored in the computer.

22. The system recited in claim 20, wherein the appropriate action comprises:
spoofing, upon request by a systems administrator or security officer, the user into believing that the access has been gained to the computer, wherein spoofing includes the presentation of false messages and information to the user.

23. The system recited in claim 20, wherein the appropriate action comprises:
locking the computer, upon request of a systems administrator or security officer, and displaying a login screen for the user to re-authenticate the user identification and password.

24. The system recited in claim 18, further comprising:
an authentication module to re-authenticate the user after the user login module has found a match in the one-way encrypted password contained in the computer by checking the user identification and password against a master password file stored in a computer accessible by a systems administrator or security officer.

25. The system recited in claim 19, wherein the password management module attaches a master password file containing a complete user identifications, associated one-way encrypted passwords and associated privileges to a message, encrypts the message using a private key and pass phrase for the system administrator or security officer and broadcasts the message to all users.

26. The system recited in claim 25, wherein the password management module decrypts the message using a public key associated with the private key, replaces the one-way encrypted password file when decryption of the message is successful and reports a failure to the system administrator or security officer when the decryption is not successful.

27. A computer program executable by a computer and embedded in a computer readable medium to administer access and security on a network having a plurality of computers, comprising:
a one-way encrypted password file on each computer of the plurality of computers in the network, wherein the one-way encrypted password file includes a plurality of user identifications, associated one-way encrypted passwords and associated privileges for each authorized user allowed access to the plurality of computers and the network;
a user login code segment to receive a user identification or role and password from a user and login the user when a match is found in the one-way encrypted password file;
a channel monitoring and filtering code segment to monitor and receive broadcast or multicast messages within the network and display the message to the user when the user's associated privileges permit the viewing of the message; and
a remote control code segment that enables a systems administrator or security officer to take appropriate action when an anomalous event transpires, the appropriate action including spoofing the user into believing that the access has been gained to the computer, wherein spoofing includes the presentation of false messages and information to the user.

28. The computer program recited in claim 27, further comprising:

a password management code segment to update and insure that all the computers in the network contain the same one-way encrypted password file.

29. The computer program recited in claim 27, further comprising:

a remote auditing code segment to monitor and process anomalous events which may occur on the computer.

30. The computer program recited in claim 29, wherein the anomalous events comprise:

the user has exceeded the number of allowable unsuccessful login attempts;

a change in the users associated privileges has occurred;

a system disable operation was initiated by the user;

a user's password has expired;

a message was rejected due to an invalid digital signature;

a request for remote user re-authentication has been received by the systems administrator or security officer;

a request for a remote user lockout has been received by the system administrator or security officer; and a request for remote loading passwords has completed successfully on the system administrator or security officer.

31. The computer program recited in claim 27, wherein the appropriate action comprises:

disabling, upon request by the systems administrator or security officer, the computer system so that the user cannot access the computer system; and deleting, upon request by a systems administrator or security officer, a plurality of files stored in the computer.

32. The computer program recited in claim 27, wherein the appropriate action comprises:

locking the computer, upon request of a systems administrator or security officer, and displaying a login screen for the user to re-authenticate the user identification and password.

33. The computer program recited in claim 27, further comprising:

an authentication code segment to re-authenticate the user after the user login code segment has found a match in the one-way encrypted password contain in the computer by checking the user identification and password against a master password file stored in a computer accessible by a systems administrator or security officer.

34. The computer program recited in claim 28, wherein the password management code segment attaches a master password file containing a complete user identifications, associated one-way encrypted passwords and associated privileges to a message, encrypts the message using a private key and passphrase for the system administrator or security officer and broadcasts the message to all users.

35. The computer program recited in claim 34, wherein the password management code segment decrypts the message using a public key associated with the private key, replaces the one-way encrypted password file when decryption of the message is successful and reports a failure to the system administrator or security officer when the decryption is not successful.

* * * * *